(12) United States Patent
Assad

(10) Patent No.: US 10,496,387 B2
(45) Date of Patent: Dec. 3, 2019

(54) CROWDSOURCED API RESOURCE CONSUMPTION INFORMATION FOR INTEGRATED DEVELOPMENT ENVIRONMENTS

(71) Applicant: Microsoft Technology Licensing, LLC, Redmond, WA (US)

(72) Inventor: Javier Nisim Flores Assad, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/944,716

(22) Filed: Apr. 3, 2018

(65) Prior Publication Data

US 2019/0303125 A1  Oct. 3, 2019

(51) Int. Cl.
*G06F 9/445*     (2018.01)
*G06F 8/61*      (2018.01)
*G06F 8/20*      (2018.01)
*G06F 9/54*      (2006.01)
*G06F 11/34*     (2006.01)

(52) U.S. Cl.
CPC .................. *G06F 8/64* (2013.01); *G06F 8/20* (2013.01); *G06F 9/54* (2013.01); *G06F 11/3409* (2013.01)

(58) Field of Classification Search
CPC .................................... G06F 8/60; G06F 8/64
USPC .................................................. 717/170–177
See application file for complete search history.

(56) References Cited

U.S. PATENT DOCUMENTS 6,049,664 A * 4/2000 Dale ..................... G06F 9/4862
                                                    717/174
6,473,794 B1 * 10/2002 Guheen .................. H04L 41/22
                                                    709/223

(Continued)

FOREIGN PATENT DOCUMENTS

WO     2016146004 A1    9/2016
WO     2017041657 A1    3/2017

OTHER PUBLICATIONS

Johann et al, "Sustainable Development, Sustainable Software, and Sustainable Software Engineering An Integrated Approach", IEEE, pp. 1-6 (Year: 2011).*

(Continued)

*Primary Examiner* — Anil Khatri
(74) *Attorney, Agent, or Firm* — Fountainhead Law Group P.C.

(57) ABSTRACT

Some embodiments provide a first computer system that receives a specification of a target computing device through an integrated development environment (IDE) operating on the first computer system. The first computer system further receives input referencing an application programming interface (API) call through the IDE operating on the first computer system. In response to the input, the first computer system also sends a second computing system a request for data associated with resource consumption during execution of the API call by a set of source devices. The set of source devices each has the same specification as the target computing device. The first computer system further receives the data associated with the resource consumption during execution of the API call by the set of source devices. The first computer system also presents the data through the IDE.

20 Claims, 5 Drawing Sheets

(56) References Cited

U.S. PATENT DOCUMENTS

| | | | |
|---|---|---|---|
| 6,662,357 B1* | 12/2003 | Bowman-Amuah | G06F 8/20 |
| | | | 717/120 |
| 6,934,749 B1* | 8/2005 | Black | G06F 1/14 |
| | | | 709/217 |
| 7,055,149 B2* | 5/2006 | Birkholz | G06F 8/65 |
| | | | 705/59 |
| 7,069,234 B1* | 6/2006 | Cornelius | G06Q 20/10 |
| | | | 705/26.35 |
| 7,140,012 B2* | 11/2006 | Pugh | G06F 8/71 |
| | | | 717/170 |
| 7,263,590 B1* | 8/2007 | Todd | G06F 12/02 |
| | | | 711/165 |
| 7,305,671 B2* | 12/2007 | Davidov | G06F 8/30 |
| | | | 717/108 |
| 8,127,284 B2* | 2/2012 | Meijer | G06F 9/44521 |
| | | | 717/166 |
| 8,819,629 B2 | 8/2014 | Sherrill | |
| 9,158,540 B1* | 10/2015 | Tzelnic | G06F 11/108 |
| 9,396,046 B2 | 7/2016 | Laredo et al. | |
| 9,531,764 B1* | 12/2016 | McHugh | H04L 67/142 |
| 9,589,578 B1 | 3/2017 | Dippenaar | |
| 9,813,318 B2* | 11/2017 | Iyoob | H04L 43/08 |
| 9,843,624 B1* | 12/2017 | Taaghol | H04L 67/10 |
| 10,255,067 B2* | 4/2019 | Noens | G06F 8/77 |
| 2004/0031030 A1* | 2/2004 | Kidder | G06F 1/14 |
| | | | 717/172 |
| 2009/0328028 A1* | 12/2009 | O'Rourke | G06F 8/65 |
| | | | 717/173 |
| 2014/0372985 A1 | 12/2014 | Levin et al. | |
| 2015/0082441 A1 | 3/2015 | Gathala et al. | |
| 2017/0124211 A1 | 5/2017 | Suter et al. | |

OTHER PUBLICATIONS

Chang et al, "Issues of Extending the User Interface of Integrated Development Environment", ACM, pp. 23-30 (Year: 2008).*

Jlassi et al, "Virtualization Technologies for the Big Data Environment", ACM, pp. 542-545 (Year: 2016).*

Takase et al, "An Integrated Optimization Framework for Reducing the Energy Consumption of Embedded Real-Time Applications", IEEE, pp. 271-276 (Year: 2011).*

Ahituv et al, "A Model for Predicting and Evaluating Computer Resource Consumption", ACM, pp. 1467-1473 (Year: 1988).*

Callou et al, "A Coloured Petri Net Based Approach for Estimating Execution Time and Energy Consumption in Embedded Systems", ACM, pp. 134-139 (Year: 2008).*

"Frameworks Annotations and Syntax", Retrieved from <<https://cloud.google.com/endpoints/docs/frameworks/java/annotations>>, Retrieved on Nov. 10, 2017, 17 Pages.

* cited by examiner

FIG. 3

INTEGRATED DEVELOPMENT ENVIRONMENT (IDE) — 300

Panel 305

```
Foo ()
{
    . . . . . . . . .
    API_FUNCTION_10;
    . . . . . . . . .
}
```

Callout 320: API_CALL_1 PERFORMANCE: 45 MS LATENCY, 3.6K CPU CYCLES, 33 MB MEMORY, 950 IOPS, 5.7K NETWORK PACKETS

Panel 310

TARGET COMPUTER SYSTEM

| Field | Value |
|---|---|
| # OF CPUs: | 2 (325) |
| # OF CORES/CPU: | 4 (330) |
| TYPE OF CPU: | INTEL CORE i5 (335) |
| AMOUNT OF MEMORY: | 16 GB (340) |
| # OF STORAGE UNITS: | 1 (345) |
| TYPE OF STORAGE: | SSD (350) |

Panel 315

CROWDSOURCED API RESOURCE CONSUMPTION INFORMATION FOR INTEGRATED DEVELOPMENT ENVIRONMENTS

BACKGROUND

A common problem regarding resource consumption on computing devices comes from the lack of understanding of the cost of an operation, API call, or method invocation. In the areas of performance, memory utilization, and power consumption of APIs, there may not be much help and information available to a developer while the developer is writing code that includes API calls about the implications of the API calls being used even though the implications may sometimes be known either by the author or by the community. That is because a developer that uses API calls in programs may only know about what functions the API calls provide and not know how the API calls are implemented. In some cases, a developer may learn that certain API calls are "expensive" to use. For example, the developer might manually measure the resource consumption of API calls when they are being invoked. Once the developer learns about the API calls, the developer may write code with that knowledge in mind and avoid using "expensive" API calls as much as possible.

SUMMARY

In some embodiments, a first computer system receives a specification of a target computing device through an integrated development environment (IDE) operating on the first computer system. The first computer system further receives input referencing an application programming interface (API) call through the IDE operating on the first computer system. In response to the input, the first computer system also sends a second computing system a request for data associated with resource consumption during execution of the API call by a set of source devices. The set of source devices each has the same specification as the target computing device. The first computer system further receives the data associated with the resource consumption during execution of the API call by the set of source devices. The first computer system also presents the data through the IDE.

BRIEF DESCRIPTION OF THE DRAWINGS

FIG. 3 illustrates an example graphical user interface (GUI) of an integrated development environment (IDE) according to some embodiments.

DETAILED DESCRIPTION

Figure 1:
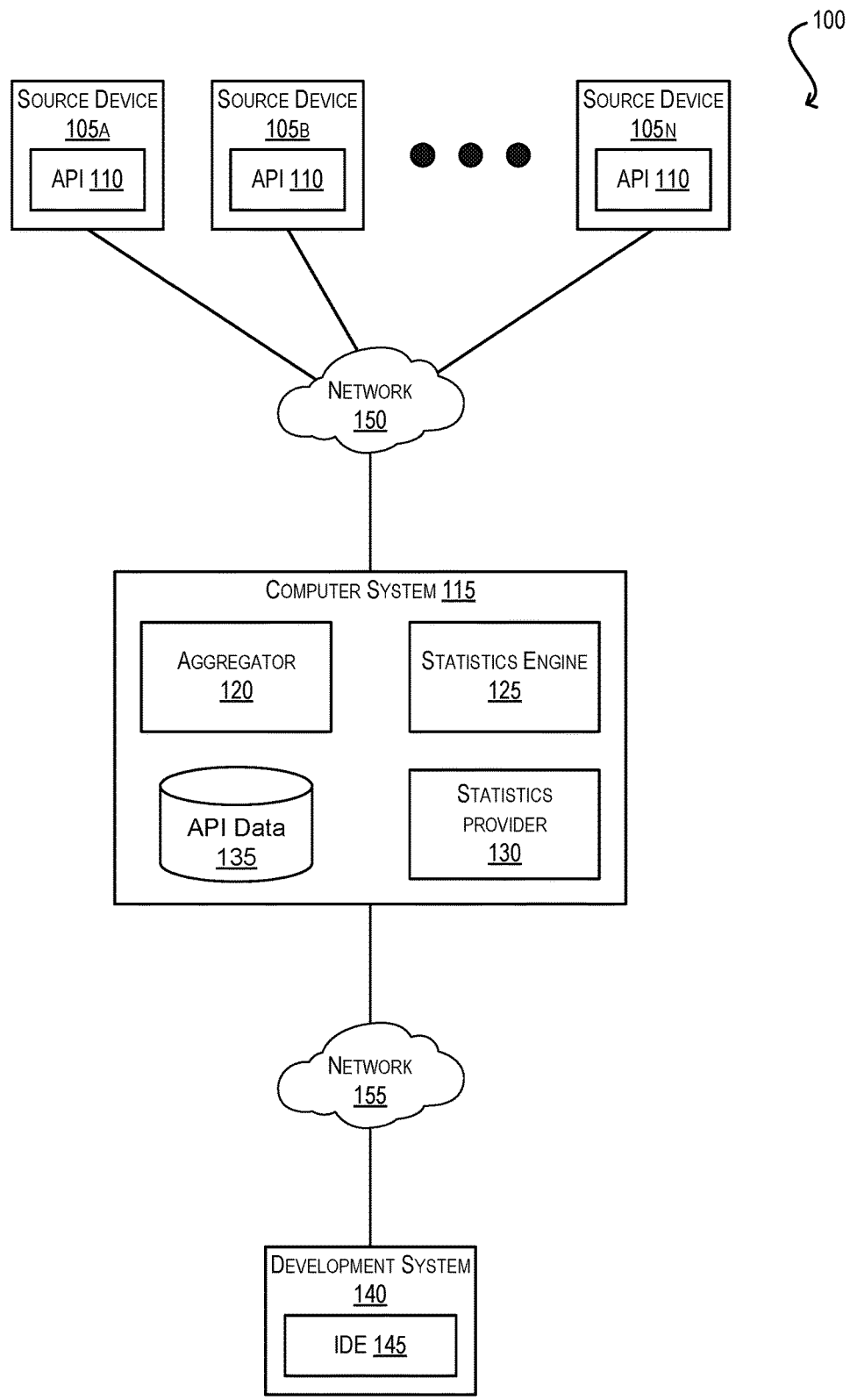
FIG. 1 illustrates a system according to some embodiments.

In the following description, for purposes of explanation, numerous examples and details are set forth in order to provide an understanding of various embodiments. It will be evident, however, to one skilled in the art that some embodiments can be practiced without some of these details, or can be practiced with modifications or equivalents thereof.

1. Overview

Described herein are techniques for providing crowdsourced application programming interface (API) resource consumption information for integrated development environments (IDEs). Generally, this may be achieved through two stages: a first stage for collecting and processing API resource consumption data and a second stage for providing the processed API resource consumption data. In the first stage, API calls (also referred to as methods, functions, subroutines, etc.) are invoked on a number of different source devices. Each source device collects resource consumption data associated with the execution of the API calls on the source device. The source devices may send the collected data along with some device information to a computer system (e.g., a cloud computer system). The computer system processes the data and generates other data (e.g., statistical data) associated with the resource consumption data associated with the API calls.

In the second stage, a user of a development system may use an IDE operating on the development system to develop software (e.g., create a program, writing code, etc.). The user can specify system information for a target computing device. While writing a program using the IDE, the user may specify a particular API call to be included in the program. In response, the IDE may request from the computer system resource consumption data associated with the execution of the particular API call by source devices that have the same or similar characteristics as the target computing device. When the IDE receives such data from the computer system, the IDE presents the data through the IDE for the user to view.

Using the techniques described herein, various advantages can be realized over existing approaches to providing API resource consumption information. First, since API resource consumption information can be collected from source devices, stored on a centralized computer system, and processed to produce useful statistical data, IDEs operating on development systems are able to quickly access the data stored on the centralized computer system and provide it to users of the IDEs while the users are developing software. This allows the IDEs to efficiently provide API resource consumption data collected from many source devices.

Second, because API resource consumption information can be crowdsourced from a variety of different source devices, IDEs operating on development systems can provide resource consumption data associated with different API calls for different specified target computing devices. This is a vast improvement over existing approaches such as manual measurement of resource consumption information because such approaches would require setting up different computer systems with the desired configurations and manually measuring the resource consumption of each computer system. Further, The foregoing and other aspects of the present disclosure are described in further detail below.

2. System Environment

FIG. 1 illustrates a system 100 according to some embodiments. Specifically, system 100 may be used to implement the techniques for providing crowdsourced API resource consumption information for IDEs in some embodiments. As shown, system 100 includes source devices 105*a-n*, computer system 115, development system 140, and networks 150 and 155. Network 150 may be a personal area network (PAN), a local area network (LAN), a storage area network (SAN), a campus area network (CAN), a metropolitan area network (MAN), a wide area network (WAN), a global area network (GAN), an intranet, the Internet, a wireless voice and/or data network, or a combination thereof. Similarly, network 155 can be a personal area network (PAN), a local area network (LAN), a storage area network (SAN), a campus area network (CAN), a metropolitan area network (MAN), a wide area network (WAN), a global area network (GAN), an intranet, the Internet, a wireless voice and/or data network, or a combination thereof. In some embodiments, networks 150 and 155 are different networks. In other embodiments, some or all of network 150 may be part of network 155. Still, in some embodiments, some or all of network 155 may be part of network 150.

As illustrated in FIG. 1, each source device 105 in source devices 105a-n includes an API 110. In some embodiments, API 110 is a method, function, or subroutine that an author (e.g., a software developer, a programmer, etc.) creates and compiles for execution by a computing device (e.g., a source device 105). In some embodiments, API 110 is implemented as a library that, once compiled, is distributed to each of the source devices 105a-n. When the author of API 110 is writing code for API 110, the author may include an annotation indicating to enable measuring of resource consumption when API 110 is executed. When such code is compiled by a compiler, the compiler transforms the code into object code and outputs the object code. The compiler also includes instructions in object code for starting the measurement of resource consumption before the instructions implementing the operations of API 110 and includes instructions in the object code for stopping the measurement of resource consumption after the instructions implementing the operations of API 110. In some embodiments, API 110 is configured to stop taking resource consumption measurements (e.g., as instructed by computer system 115) if a threshold amount of resource consumption measurements have been collected (e.g., as determined by computer system 115), based on a periodic policy, or if the API 110 has been invoked (e.g., resource consumption measurements taken) a defined number of times or a defined number of times within a defined period of time. In some embodiments, a user of a source device 105 may need to provide input indicating that resource consumption may be measured on the source device 105 in order for API 100 to measure resource consumption data during its execution. If the user of the source devices 105 does not provide such input, the source device 105 will not measure resource consumption data during the execution of API 110 despite API 110 having such instructions. Thus, in some such embodiments, a portion of source devices 105a-n may be configured to measure resource consumption data while the rest of source devices 105a-n may be configured to not measure resource consumption data.

Figure 2:
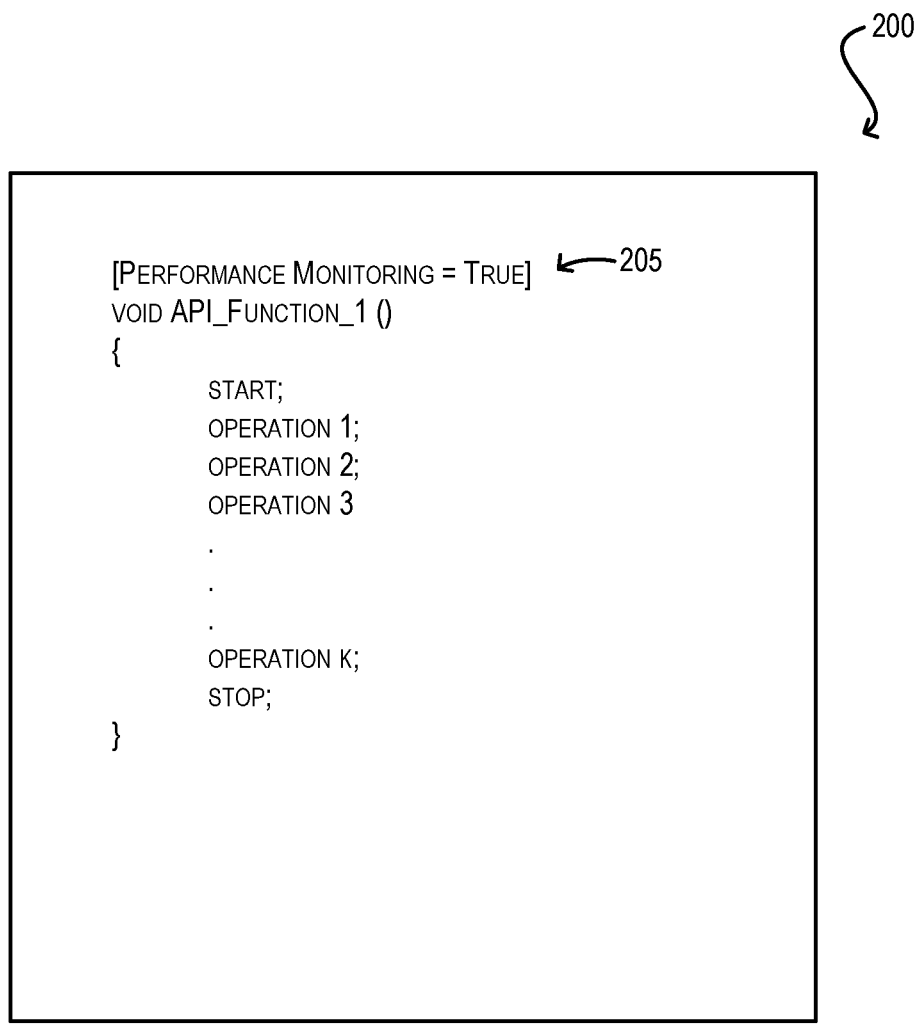
FIG. 2 illustrates an example piece of code for an API function with resource consumption measurement enabled according to some embodiments.

FIG. 2 illustrates an example piece of code 200 for an API function with resource consumption measurement enabled according to some embodiments. Specifically, the piece of code 200 is for an API called "API_Function_1," which in this example is the function name for API 110. As shown in FIG. 2, code 200 includes an annotation 205 indicating to enable measuring of resource consumption when API_Function_1 is executed. When code 200 is compiled by a compiler, the object code generated by the compiler includes instructions (conceptually illustrated by a START tag) for starting the measurement of resource consumption before the instructions implementing the operations 1-k of API_Function_1 and includes instructions for stopping (conceptually illustrated by a STOP tag) the measurement of resource consumption after the instructions implementing the operations 1-k. In this example, the compiler includes the instructions for starting and stopping the measurement of resource consumption upon the detection of annotation 205. While FIG. 2 shows the START and STOP tags as being part of code 200, the tags are depicted in code 200 only to conceptually illustrate the relative points at which the compiler includes the instructions mentioned above. A developer of code 200 does not provide these tags when writing code 200.

Referring back to FIG. 1, each source device 105 is configured to execute programs, applications, code, etc. that can invoke API 110. For example, a program executing on a source device 105 may include instructions that invoke API 110. When the source device 10 executes the instructions that invoke API 110, the source device 105 executes API 110, which may cause the source device 105 to measure the resources consumed by API 110 from the start of the execution of API 110 until the end of the execution of API 110. The source device 105 then stores the measured resource consumption in a local storage (not shown) of the source device 105. After measuring and storing the resource consumption data, the source device 105 may send the data to computer system 115 via network 150. In some embodiments, the source device 105 sends computer system 115, via network 150, resource consumption data associated with the execution of API 110 at defined intervals (e.g., once per hour, once every twelve hours, once per day, etc.). In other embodiments, the source device 105 sends computer system 115, via network 150, resource consumption data associated with the execution of API 110 after a threshold amount of data has been collected and stored in the local storage of the source device 105.

The resource consumption data that a source device 105 measures during execution of the respective API 100 can include the latency between the start of the execution of API 110 on the source device 105 and the end of the execution of the API 110 on the source device 105 (i.e., an amount of time that elapsed between the start of the execution of API 110 on the source device 105 and the end of the execution of API 110 on the source device 105), the amount of processing power (e.g., a number of central processing unit (CPU) cycles) consumed by API 110, the amount of memory (e.g., an amount of random access memory (RAM)) consumed by API 110, the amount of secondary storage utilization (e.g., a number of input/output operations per second (IOPS)) consumed by API 110, and the amount of network bandwidth (e.g., a number of network packets) consumed by API 110. One of ordinary skill in the art will understand that the source device 105 can measure additional and/or different resource consumption data during execution of the respective API 100.

Along with API resource consumption data, each source device 105 may also send computer system 115 system information associated with the source device 105. Examples of such system information may include the number of processors included in the source device 105; the number of cores included in each processor; the type, make, and/or model of the processors; the amount of memory (e.g., RAM) included in the source device 105; the number of secondary storage units included in the source device 105; the type of secondary storage units (e.g., hard disk drives (HDDs), solid-state drives (SSDs), flash memory, optical disc drives, etc.); the type, make, and/or model of the graphics processing unit (GPU) included in the source device 105; the type, make, and/or model of the source device 105 (e.g., a tablet, a smartphone, a laptop, a Microsoft Surface Book® computing device, a Microsoft Surface Pro computing device, a Microsoft Surface Studio® computing device, etc.) the operating system running on the source device 105; the applications installed on the operation system; etc.

As shown in FIG. 1, computer system 115 includes aggregator 120, statistics engine 125, statistics provider 130, and API data storage 135. API data storage 135 is configured to store API resource consumption data received from source devices 105a-n and statistics data generated based on the API resource consumption data received from source devices 105a-n.

Aggregator 120 is responsible for handling API resource consumption data from source devices 105a-n via network 150. For instance, when aggregator 120 receives API resource consumption data from a source device 105, aggregator 120 stores it in API data storage 135.

Statistics engine 125 is configured to generate statistics data based on API resource consumption data. For example, statistics engine 125 may access API data storage 135 to retrieve resource consumption data associated with the execution of a particular API call (e.g., API 110) on a certain type of source device 105 (e.g., source devices 105 that are tablets; source devices 105 that have a single processor, one core per processor, an Intel Pentium processor, 8 GB of memory, one secondary storage unit, and an HDD secondary storage unit type; source devices 105 that are Microsoft Surface Book® computing devices; etc.), generate statistics data based on the retrieved resource consumption data, and store the generated data in API data storage 135. Statistics engine 125 may do this for each and every permutation of API and type of source devices 105a-n. In this manner, API data storage 135 can store statistics data for each and every permutation of API call and type of source device 105. Examples of statistics data for a particular API call and type of source device 105 can include a minimum value, a maximum value, an average value, percentile values, etc. for each of the different resource consumption data measured by the source devices 105 (e.g., the latency between the start of the execution of the particular API call on the source device 105s and the end of the execution of the particular API call on the source devices 105, the amount of processing power consumed by the particular API call, the amount of memory consumed by the particular API call, the amount of secondary storage utilization consumed by the particular API call, and the amount of network bandwidth consumed by the particular API call. One of ordinary skill in the art will understand that the source device 105 can measure additional and/or different resource consumption data during execution of the respective API 100.

Statistics provider 130 handles API data requests from development system 140. For instance, statistics provider 130 can receive a request from development system 140, via network 155, for resource consumption data associated with the execution of the particular API on a certain type of source device 105. In response to the request, statistics provider 130 accesses API data storage 135 to retrieve the requested data and then sends, via network 155, the retrieved data to development system 140.

As illustrated in FIG. 1, development system 140 includes integrated development environment (IDE) 145. IDE 145 may be a software application configured to provide tools for developing software. In some embodiments, IDE 145 provides a graphical user interface (GUI) through which the tools for developing software are provided. FIG. 3 illustrates an example graphical user interface (GUI) 300 of an integrated development environment (IDE) according to some embodiments. As shown, GUI 300 includes three display areas: panel 305, panel 310, and panel 315. In this example, panel 305 is configured to receive input (e.g., text input, mouse input, etc.) specifying the source code for programs, methods, subroutines, or a combination thereof.

Returning back to FIG. 1, IDE 145 can also be configured to receive system information for a target computing device. System information for the target computing device can include the number of processors included in the target computing device; the number of cores included in each processor; the type, make, and/or model of the processors; the amount of memory (e.g., RAM) included in the target computing device; the number of secondary storage units included in the target computing device; the type of secondary storage units (e.g., hard disk drives (HDDs), solid-state drives (SSDs), flash memory, optical disc drives, etc.); the type, make, and/or model of the graphics processing unit (GPU) included in the target computing device; the type, make, and/or model of the target computing device (e.g., a tablet, a smartphone, a laptop, a Microsoft Surface Book computing device, a Microsoft Surface Pro computing device, a Microsoft Surface Studio® computing device, etc.) the operating system running on the target computing device; the applications installed on the operation system; etc.

Referring to FIG. 3 as an example, panel 310 of GUI 300 is configured to receive system information for a target computing device in this example. As shown, panel 310 includes input controls 325-350. Input control 325 is configured to receive input specifying a number of processors included in the target computing device, input control 330 is configured to receive input specifying a number of cores per processors, input control 335 is configured to receive input specifying a type of processor, input control 340 is configured to receive input specifying an amount of memory, input control 345 is configured to receive input specifying a number of secondary storage units included in the target computing device, and input control 350 is configured to receive input specifying a type of secondary storage unit.

Returning back to FIG. 1, IDE 145 may be further configured to provide resource consumption data associated with APIs referenced in source code specified in IDE 145. For example, IDE 145 can receive input referencing a particular API (e.g., API 110) in source code specified in IDE 145. In response to such input, IDE 145 sends computer system 110, via network 155, a request for resource consumption data associated with the execution of the particular API based on the system information specified for the target computing device. When IDE 145 receives the requested data from computer system 110, IDE 145 presents it for viewing. IDE 145 uses the system information specified for the target computing device to determine the type of API resource consumption data requested from computer system 110. For instance, if the system information for the target computing device specifies one CPU, four cores per CPU, an AMD Ryzen® processor, 8 GB of memory, and an HDD secondary storage unit, IDE 145 would send computer system 110, via network 155, a request for API resource consumption data generated from source devices that have the same configuration as that specified for the target computing device. Similarly, if the system information for the target computing device specifies a tablet, IDE 145 would send computer system 110, via network 155, a request for API resource consumption data generated from source devices that are tablets. As another example, if the system information for the target computing device specifies a Microsoft Surface Pro computing device, IDE 145 would send computer system 110, via network 155, a request for API resource consumption data generated from source devices that are Microsoft Surface Pro computing devices.

Referring to FIG. 3 as an example, FIG. 3 further illustrates that a user of development system 140 has specified a target computing device to include two CPUs, four cores per CPU, an Intel Core® i5 processor, 16 GB of memory, one secondary storage unit, and an SSD secondary storage unit type. As shown, the user of IDE 145 has provided in panel 305 of GUI 300 text input specifying source code for a method called Foo that references the API call "API_Function_1," which is the function name of API 110 in this example. Upon receiving the reference to the API call "API_Function_1," IDE 145 sends computer system 110, via network 155, a request for resource consumption data generated from the execution of the API call "API_Function_1" (i.e., API 110) on source devices 105a-n that have the same configuration as that specified for the target computing device (i.e., source devices 105a-n that have two CPUs, four cores per CPU, an Intel Core® i5 processor, 16 GB of memory, one secondary storage unit, and an SSD secondary storage unit type). When IDE 145 receives the requested data from computer system 110, IDE 145 presents it in panel 305. For this example, IDE 145 provides the API resource consumption data in a notification window 320 (e.g., a text bubble) that IDE 145 overlays over panel 305. While the example in FIG. 3 shows API resource consumption data presented in a notification window 320 overlaying panel 305, one of ordinary skill in the art will realize that IDE 145 may present the API resource consumption data in any number of different ways. For instance, IDE 145 may provide the API resource consumption data in a different panel (e.g., panel 315), a text bubble, a notification area provided by the operating system, etc. In some instances, IDE 145 API can provide (e.g., via user preferences) an option to automatically present and hide resource consumption data based on mouse-over/pointer-over or an option to always present resource consumption data.

It should be appreciated that system 100 of FIG. 1 is illustrative and not intended to limit embodiments of the present disclosure. For example, although only a single API 110 is shown included in each of the source devices 105a-n, any number of additional and/or different APIs that include code to monitor and collect resource consumption information during the execution of the respective API may be included in, and invoked by, source devices 105a-n. In addition, different source devices 105a-n may include different sets of such APIs. Furthermore, while system 100 is shown to include only a single development system 140, any number of development systems that include an IDE may be supported. This way, the API resource consumption data collected and processed by computer system 115 may be shared among multiple different development systems. Moreover, the various entities shown in system environment 100 may include sub-components or implement other functions that are not specifically described above. One of ordinary skill in the art will recognize many variations, modifications, and alternatives.

3. API Resource Consumption Data Provision Process

Figure 4:
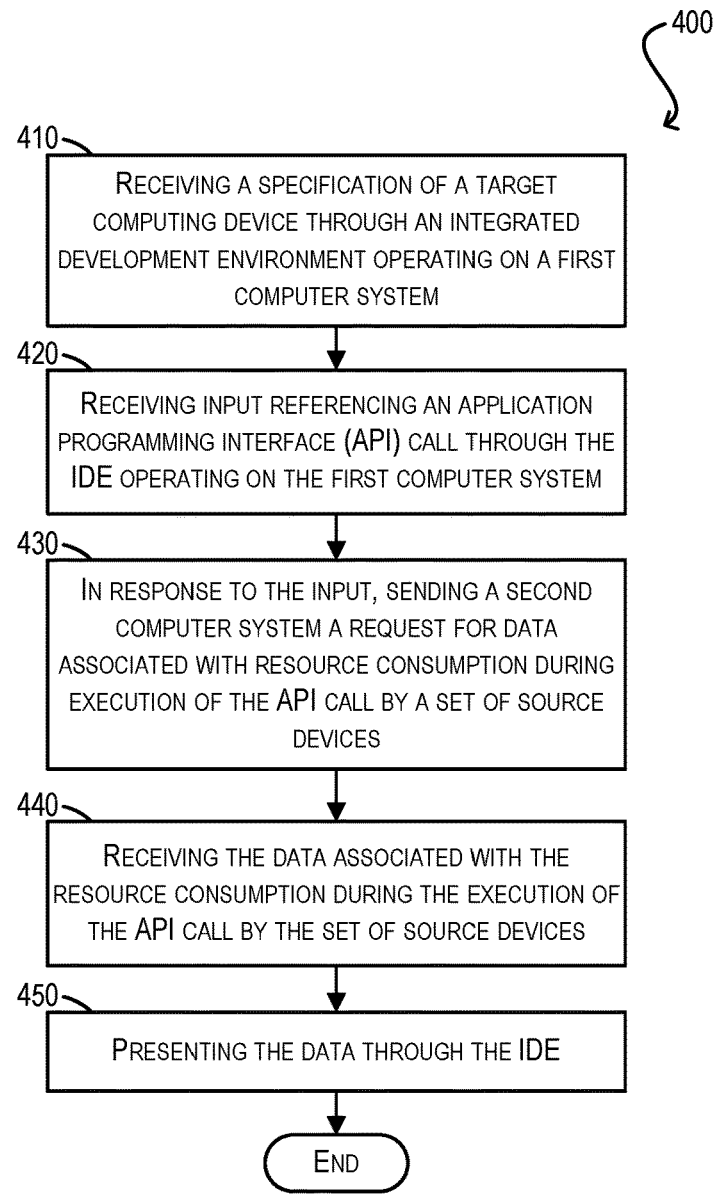
FIG. 4 illustrates a process according to some embodiments.

FIG. 4 illustrates a process 400 according to some embodiments. In some embodiments, development system 140 performs process 400. Process 400 begins by receiving, at 410, a specification of a target computing device through an integrated development environment operating on a first computer system. Referring to FIGS. 1 and 3 as an example, IDE 145 may provide GUI 300 to a user of development system 140. Through panel 310 of GUI 300, IDE 145 may receive from a user of development system 140 specification of a target computing device. For this example, the user of development system 140 specifies two CPUs, four cores per CPU, an Intel Core i5® processor, 16 GB of memory, one secondary storage unit, and an SSD secondary storage unit type for the target computing device.

Next, process 400 receives, at 420, input referencing an application programming interface (API) call through the IDE operating on the first computer system. Referring to FIGS. 1 and 3 as an example, a user of IDE 145, which is operating on development system 140, has provided text input specifying source code for a method called Foo that references the API call "API_Function_1," which is the function name of API 110, in panel 305 of GUI 300. In response to the input, process 400 sends, at 430, a second computer system a request for data associated with resource consumption during execution of the API call by a set of source devices. Referring to FIGS. 1 and 3 as an example, after receiving the reference to the API call "API_Function_1," IDE 145 sends computer system 110, via network 155, a request for resource consumption data generated from the execution of the API call "API_Function_1" (i.e., API 110) on source devices 105a-n that have the same configuration as that specified for the target computing device (i.e., source devices 105a-n that have two CPUs, four cores per CPU, an Intel Core i5® processor, 16 GB of memory, one secondary storage unit, and an SSD secondary storage unit type).

Process 400 then receives, at 440, the data associated with resource consumption during execution of the API call by a set of source devices. Referring to FIGS. 1 and 3 as an example, IDE 145 may receive the requested resource consumption data from computer system 110, via network 155. Finally, process 400, at 450, presents the data through the IDE. Referring to FIGS. 1 and 3 as an example, upon receiving the requested data from computer system 110, IDE 145 presents the data in panel 305. As shown in FIG. 3, IDE 145 provides the API resource consumption data in a notification window 320 (e.g., a text bubble) that IDE 145 overlays over panel 305.

It should be appreciated that process 400 is illustrative and various modifications to the processing in process 400 are possible. For example, although operation 410 indicates that process 300 receives a specification of a target computing device through an integrated development environment operating on a first computer system, in some instances a specification of a target computing device is not received (e.g., a user of IDE 145 does not specify system information for a target computing device through panel 310 of GUI 300). In some such instances, IDE 145 automatically generates a default specification for the target computing device. For instance, IDE 145 may use the system information of development system 140, the system on which IDE 145 is operating.

4. Computer System Architecture

Figure 5:
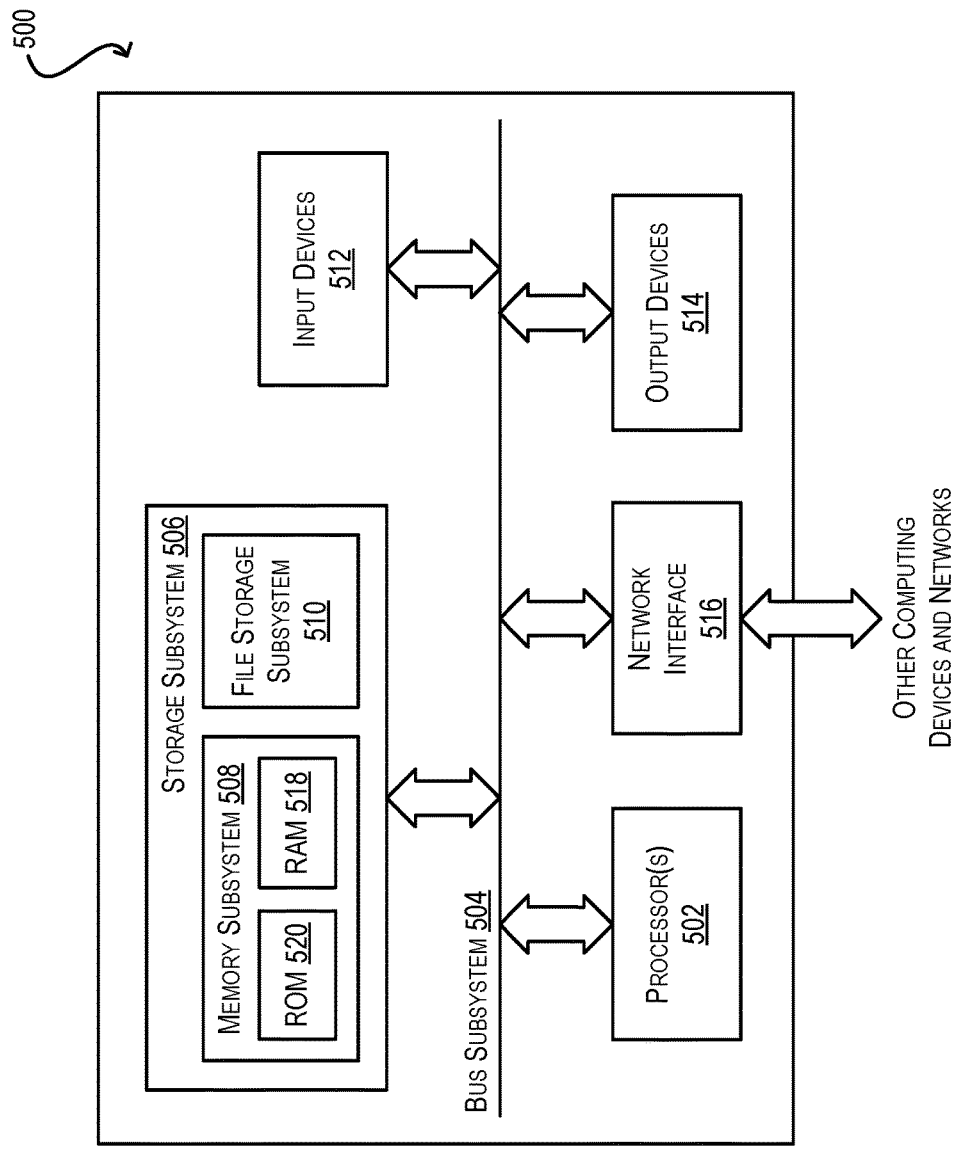
FIG. 5 illustrates an architecture of a computer system according to some embodiments.

FIG. 5 is a simplified block diagram illustrating the architecture of an example computer system 500 according to certain embodiments. Computer system 500 (and/or equivalent systems/devices) may be used to implement source devices 105a-n, computer system 115, and development system 140 of FIG. 1. As shown in FIG. 5, computer system 500 includes one or more processors 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Some embodiments of network interface subsystem 516 can include, e.g., an Ethernet module, a Wi-Fi and/or cellular connectivity module, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computer system 500.

User interface output devices 514 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computer system 500.

Storage subsystem 506 includes a memory subsystem 508 and a file/disk storage subsystem 510. Subsystems 508 and 510 represent non-transitory computer-readable storage media that can store program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computer system 500 is illustrative and other configurations having more or fewer components than computer system 500 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process operations and steps, it should be apparent to those skilled in the art that the scope of the present disclosure is not strictly limited to the described operations and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A first computer system comprising:
 a processor;
 a computer readable storage medium having stored thereon program code that, when executed by the processor, causes the processor to:
  receive a specification of a target computing device through an integrated development environment (IDE) operating on the first computer system;
  receive input referencing an application programming interface (API) call through the IDE operating on the first computer system;
  in response to the input, send a second computer system a request for data associated with resource consumption during execution of the API call by a set of source devices, the set of source devices each having the same specification as the target computing device;
  receive the data associated with the resource consumption during execution of the API call by the set of source devices, wherein the data comprises statistics data generated by the second computer system based on resource consumption data that the second computer system received from the set of source devices, wherein the resource consumption data that the second computer system received from each source device in the set of source devices comprises a latency between a start of the execution of the API call on the source device and an end of the execution of the API call on the source device; and
  present the data through the IDE.

2. The computer system of claim 1, wherein the specification of the target computing device is a first specification of a first target computing device, wherein the request is a first request, wherein the input is a first input, wherein the set of source devices is a first set of source devices, wherein the data is a first data, wherein the program code further causes the processor to:
 receive a second specification of a second target computing device through the IDE operating on the first computer system;
 receive a second input referencing the API call through IDE operating on the first computer system;
 in response to the second input, send a second computer system a second request for a second data associated with resource consumption during execution of the API call by a second set of source devices, the second set of source devices each having the same specification as the second target computing device;
 receive the second data associated with the resource consumption during execution of the API call by the second set of source devices; and
 present the second data through the IDE.

3. The first computer system of claim 1, wherein the API call is a first API call, wherein the input is a first input, wherein the request is a first request, wherein the set of source devices is a first set of source devices, wherein the data is a first data, wherein the program code further causes the processor to:
receive a second input referencing a second API call through the IDE operating on the first computer system;
in response to the second input, send the second computer system a second request for a second data associated with resource consumption during execution of the second API call by a second set of source devices, the second set of source devices each having the same specification as the target computing device,
receive the second data associated with the resource consumption during execution of the second API call by the second set of source devices, and
present the second data through the IDE.

4. The first computer system of claim 1, wherein the specification of the target computing device is a first specification of a first target computing device, wherein the input referencing the API call is a first input referencing a first API call, wherein the request is a first request, wherein the set of source devices is a first set of source devices, wherein the data is a first data, wherein the program code further causes the processor to:
receive a second specification of a second target computing device through the IDE operating on the first computer system;
receive a second input referencing a second API call through the IDE operating on the first computer system;
in response to the second input, send the second computer system a second request for a second data associated with resource consumption during execution of the second API call by a second set of source devices, the second set of source devices each having the same specification as the second target computing device,
receive the second data associated with the resource consumption during execution of the second API call by the second set of source devices, and
present the second data through the IDE.

5. The first computer system of claim 1, wherein the resource consumption data that the second computer system received from each source device in the set of source devices comprises an amount of processing power consumed by the API call between a start of the execution of the API call on the source device and an end of the execution of the API call on the source device.

6. The first computer system of claim 1, wherein the resource consumption data that the second computer system received from each source device in the set of source devices comprises an amount of memory consumed by the API call between a start of the execution of the API call on the source device and an end of the execution of the API call on the source device.

7. The first computer system of claim 1, wherein the resource consumption data that the second computer system received from each source device in the set of source devices comprises an amount of secondary storage utilization consumed by the API call between a start of the execution of the API call on the source device and an end of the execution of the API call on the source device.

8. The first computer system of claim 1, wherein the resource consumption data that the second computer system received from each source device in the set of source devices comprises an amount of network bandwidth consumed by the API call between a start of the execution of the API call on the source device and an end of the execution of the API call on the source device.

9. The first computer system of claim 1, wherein the specification comprises a number of processors and a type of the processors.

10. The first computer system of claim 9, wherein the specification further comprises a number of processor cores in each processor.

11. The first computer system of claim 1, wherein the specification comprises an amount of memory.

12. The first computer system of claim 1, wherein the specification comprises a number of secondary storage units and a type of the secondary storage units.

13. The first computer system of claim 1, wherein the specification comprises an operating system.

14. The first computer system of claim 1, wherein the specification comprises a computing device model.

15. The first computer system of claim 1, wherein presenting the data through the IDE comprises presenting the data in a notification and overlaying the notification over the IDE.

16. The first computer system of claim 1, wherein the IDE comprises a graphical user interface (GUI) comprising a plurality of panels, wherein receiving the input referencing the API call through the IDE comprises receiving the input referencing the API call through a panel in the plurality of panels.

17. The first computer system of claim 16, wherein the panel is a first panel, wherein presenting the data through the IDE comprises presenting the data in a second panel in the plurality of panels.

18. The first computer system of claim 1, wherein the specification comprises a type of graphics processing unit.

19. For a first computer system, a method comprising:
receiving a specification of a target computing device through an integrated development environment (IDE) operating on the first computer system;
receiving input referencing an application programming interface (API) call through the IDE operating on the first computer system;
in response to the input, sending a second computer system a request for data associated with resource consumption during execution of the API call by a set of source devices, the set of source devices each having the same specification as the target computing device;
receiving the data associated with the resource consumption during execution of the API call by the set of source devices, wherein the data comprises statistics data generated by the second computer system based on resource consumption data that the second computer system received from the set of source devices, wherein the resource consumption data that the second computer system received from each source device in the set of source devices comprises a latency between a start of the execution of the API call on the source device and an end of the execution of the API call on the source device; and
presenting the data through the IDE.

20. A computer readable storage medium having stored thereon program code executable by a first computer system, the program code causing the first computer system to:
receive a specification of a target computing device through an integrated development environment (IDE) operating on the first computer system;
receive input referencing an application programming interface (API) call through the IDE operating on the first computer system;
in response to the input, send a second computer system a request for data associated with resource consumption during execution of the API call by a set of source devices, the set of source devices each having the same specification as the target computing device;

receive the data associated with the resource consumption during execution of the API call by the set of source devices, wherein the data comprises statistics data generated by the second computer system based on resource consumption data that the second computer system received from the set of source devices, wherein the resource consumption data that the second computer system received from each source device in the set of source devices comprises a latency between a start of the execution of the API call on the source device and an end of the execution of the API call on the source device; and present the data through the IDE.

* * * * *